UNITED STATES PATENT OFFICE.

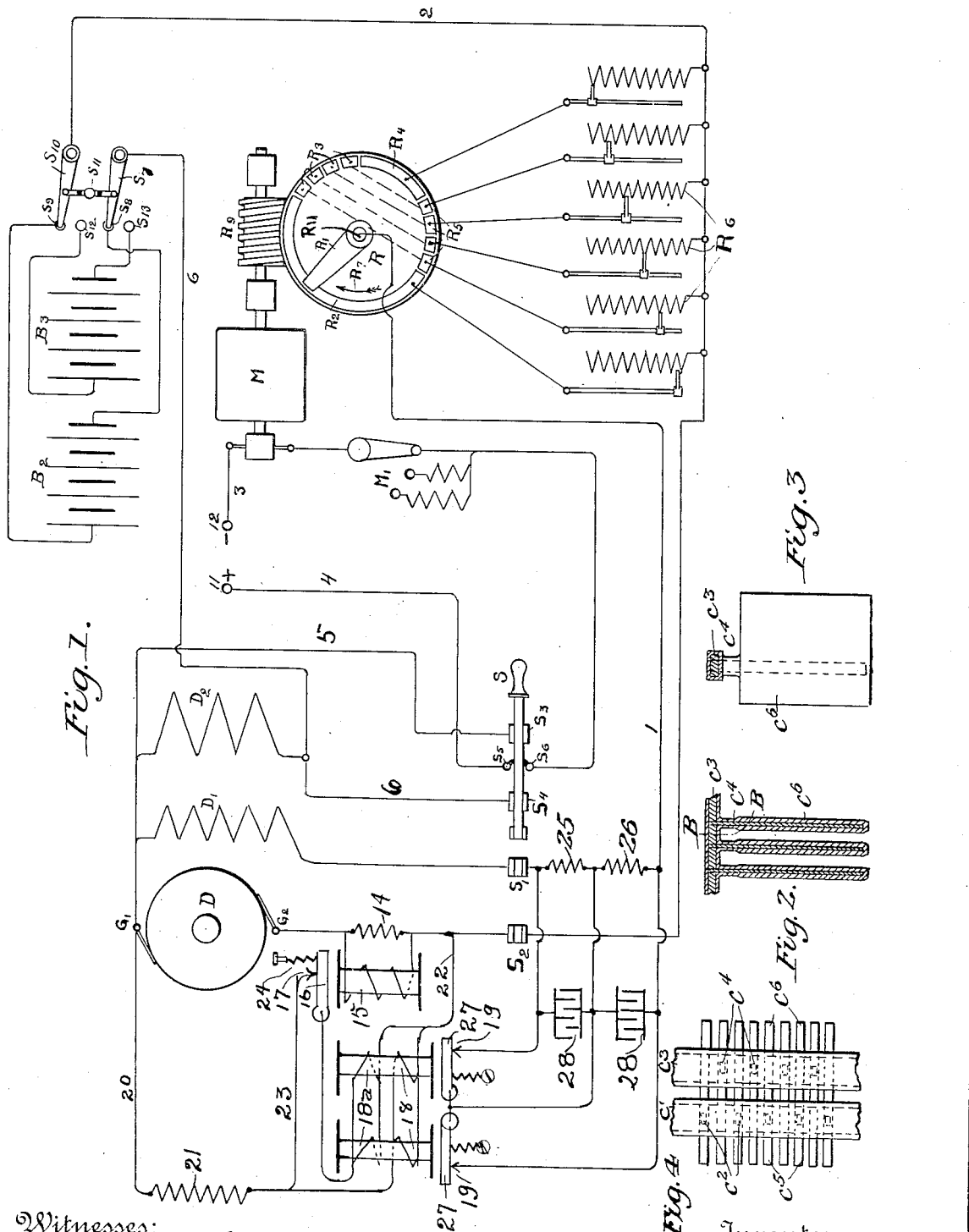

DAVID H. WILSON, OF RIDGEWOOD, NEW JERSEY, ASSIGNOR TO WILSON STORAGE BATTERY COMPANY, OF NEW YORK, N. Y., A CORPORATION OF NEW YORK.

APPARATUS FOR CHARGING STORAGE BATTERIES.

1,126,668. Specification of Letters Patent. Patented Jan. 26, 1915.

Application filed November 21, 1911. Serial No. 661,637.

*To all whom it may concern:*

Be it known that I, DAVID H. WILSON, citizen of the United States, and resident of Ridgewood, in the county of Bergen and State of New Jersey, have invented certain new and useful Improvements in Apparatus for Charging Storage Batteries, of which the following is a specification.

My invention consists of apparatus for charging storage batteries which has many marked advantages over the systems now known.

One of the objects of my invention is to greatly reduce the time required to store electrical energy in a storage battery. In accomplishing this result I charge the battery with a heavy amperage of current and then reduce it to a low amperage, thereby creating a period such as will dissipate the resistance or obstacles to charging created by the heavy charge so as to permit the heavy charge to have an efficient effect upon said plates without undue dissipation of energy in the form of heat; and then charge with the heavy amperage again. The resistance or obstacles to charging at high current rate partly consist of gases generated within the battery by the heavy charging current which tend to insulate the said solution from the battery plates; or which tend to prevent the passage of current from one to the other. In practice I employ a current for charging the battery of such amperage as will not injure plates having low resistance leading in conductors, but which would injure or destroy the efficiency of plates not so provided and then reduce the amperage to a sufficiently low amount as to allow gases to become dissipated or escape from the corrugations of the plate.

Another object of my invention is to evenly distribute the charge of current over the plates and corrugations and extend it from the outer portions of the currugations to the innermost corners.

Another object of my invention is to cause the charge to penetrate into the plates to a considerable depth and to penetrate more or less evenly over the whole corrugated surfaces of the plates, thus preventing shedding of the plates. In some batteries the active material is in the form of thin ribs. In such batteries, when charged with a low charging current, the charge takes effect most largely upon the outer edges of the ribs; and their inner edges, where they are connected to the lead or other stiffer portions of the plate, sometimes break away, causing the active material to scale off, or shed. My heavy charging current, by penetrating to the innermost recesses between the ribs, more firmly uniting them to the stiffer portions of the plate, prevents the scaling or shedding of the ribs.

Another object of my invention is to distribute the current evenly through the plates in such a way as to prevent their buckling. This is assisted by running an electrical distributer of high conductivity and considerable surface area into the interior of the plates in such a way as to enlarge the area of contact between each distributer and its plate. This enlarged area of contact and the proper location of the distributers also prevent heating. The area of contact between the distributers and plates is proportioned to the active area of the plates to insure these results.

Another object of my invention is to time the periodical heavy charges of current so as to insure the maximum charging effect and then when the creation of gases interferes with the efficient charging, to again establish efficient charging conditions by the methods mentioned above. When the gases are dissipated sufficiently to permit another efficient charging the amperage is preferably again increased up to the maximum amount which my battery construction makes possible and convenient.

Another object of my invention is to graduate the changes of current from the high amperage to the conditions which dissipate the obstacles to efficient charging in such a way as not to interfere with the general working of the circuit and its efficiency, and to prevent any reversal of the field coils of the charging machine, or short circuiting of the battery through the charging machine. The preferred method is to vary the stages between the high amperage and the low amperage in such a way that the current is "stepped down". Again, when the current is to be restored to the full amperage it is "stepped up" through resistances, either internal or external, or any other suitable means that is, the current is increased by cutting out increasingly higher resistance by means of the automatic resistance varying device.

Another object of my invention is to time the intermittent charging current, or the periodicity of its waves to get the quickest and best results. This is preferably done automatically by means of a motor of some kind, the speed of which is determined and which cuts in and cuts out resistances automatically in the shunt field circuit and the frequency and form of the charging waves is predetermined and fixed to secure efficient results. The motor also manipulates the fields and external circuit by means of the automatic switch.

A further object of my invention is to vary the charge from a high amperage to low amperage without disrupting or injuring the windings of the charging machine or other windings in the circuits.

A further object is to make such variations periodically with a predetermined speed.

A further object of my invention is to arrange the circuits so that they may be used for charging such a battery, and at any time be so switched as to charge an ordinary battery in the ordinary way by leaving the field coils in such a condition of activity as to enable them to be used with such ordinary storage batteries.

In the drawings: Figure 1 shows my charging apparatus switched to such a condition that it will charge my special battery as aforesaid. Fig. 2 is a sectional elevation of one of my series of battery plates with the electrical connections thereto; Fig. 3 is a side elevation of one of said plates. Fig. 4 is a top view of the connections to said battery plates.

In Fig. 1 my apparatus is shown in condition to charge my special battery $B^2$, which is the battery shown in some of the other figures of the drawings. When the switch S is thrown to the position shown in the full lines in Fig. 1 it accomplishes four functions. The charging machine D is connected over the following circuits: brush $C^1$, shunt field coil $D^1$, conductor 1, brush $R^1$ of the automatic resistance varying device R, contact plate $R^2$ of the said automatic resistance varying device R over one of the resistance coils $R^6$, connected between the said plate $R^2$ and conductor 2, thence by way of conductor 2 to the brush $G^2$. At the same time a multiple circuit is established from the brush $G^1$ of charging machine D by way of conductor 5, contact point $S^3$, contact point $S^4$, conductor 6, contact lever $S^7$, contact point $S^8$, battery $B^2$, contact point $S^9$, switch lever $S^{10}$, conductor 2, brush $G^2$, to the charging machine D. The series coil $D^2$ is also short circuited by conductors 5 and 6 running to the contact points $S^3$ and $S^4$ respectively, which are united together by the switch lever S. The throw of the switch lever S also connects together the contact points $S^5$ and $S^6$ by the bridge contact which is mounted upon but insulated from the lever S. The circuit thus established is traced from the terminal 11 over the conductor 4, the switch contact points $S^5$ and $S^6$, rheostat $M^1$, armature of the motor M, to the terminal 12. The terminals 11 and 12 are connected to any suitable source of current to run the motor M. This is preferably run at a steady speed. The motor M turns the worm $R^9$ which operates the brush $R^1$ mounted upon the shaft $R^{11}$ carrying the brush $R^1$ as shown in Fig. 1. The brush $R^1$ travels in the direction of the arrow $R^7$ and may rest upon the contact plate $R^2$, for the purpose of delivering a heavy amperage to the battery $B^2$. As the brush $R^1$ travels over the contact points $R^3$, higher resistances $R^6$ are introduced in the shunt field circuit, thereby reducing the amperage delivered to the battery. When the highest resistance coil $R^6$ is reached through contact plate $R^4$ the amperage is reduced to the low amperage for the purpose of dissipating the obstacles to charging created by the heavy amperage. The brush $R^1$ then travels over the contact points $R^5$ connected to varied resistance coils $R^6$ by means of which the resistance of the circuit containing the shunt field coil $D^1$ is lowered step by step. The brush then passes to plate $R^2$ which introduces the lowest resistance coil $R^6$ in the circuit of the shunt field coil $D^1$. The coils $R^6$ having varying degrees of resistance, vary the resistance or ampere field turns of the shunt field, and hence vary or control the output of the charging machine.

It will be seen that by means of this automatic resistance varying device the current flow in the shunt field coil $D^1$ is varied and steadily increased in amount as the brush $R^1$ passes from the contact plate $R^4$ to the contact plate $R^2$ and steadily increases the amperage delivery of the charging machine D. As the amperage increases and flows through the battery $B^2$ the battery is charged with a constantly increasing current. This current may be increased until the maximum charge which the battery $B^2$ is capable of receiving is delivered from the charging machine. With the particular batteries shown in Figs. 2 to 4 the large amperage heretofore described may be delivered to the battery with efficient results. When the contact $R^4$ is reached the current is reduced to such an amount as will permit the battery to free itself from the obstacles to charging. These amounts may vary in accordance with the circumstances and conditions of use, the kind of battery to be charged, and the speed at which it is desired to be charged. This gives the battery B² its period to enable it to recuperate and dispose of the obstacles to efficient charging which have been created by the preceding heavy charge. The brush R¹ again passes over the contacts as hereinbefore set forth, repeating the operation periodically, intermittently and with predetermined periodicity.

The periodicity may be varied at will by means of the rheostat M¹, by means of which the speed of the motor M may be changed so that the automatic resistance varying device R is timed to give the best results in connection with the particular sizes and designs of the batteries to be charged. When charging one thousand ampere hour batteries having twenty-nine plates with distributers having a cross sectional area of one-eighth by one-half inches, I prefer to time this automatic resistance so that it makes approximately 15 to 16 revolutions an hour. I find that it may remain upon the contact R² for about 170 seconds. The current is then "stepped down" in probably 10 seconds to the low amperage through the contact R⁴. The brush R¹ then rests upon the contact R⁴ perhaps nearly 40 seconds and then the circuit is rapidly "stepped up" so that larger and larger amounts flow through the battery as the brush R¹ passes over the contacts R⁵ and reaches the contact R². These periods of time preferably vary with various conditions so as to give the most efficient results.

When it is desired to convert the charging machine so that it may be used in connection with ordinary batteries of low charging capacity the lever S is thrown over to the contact points S¹ and S², thereby leaving the shunt field coil D¹ on a closed shunt circuit around the armature of the charging machine D and the series field coil D² in the external circuit, so that the charging machine may be used as one having a compound winding suitable for ordinary charging work where a number of standard batteries are to be charged in multiple.

The short circuit around the series field coil D² is at the same time opened between the contact points S³ and S⁴ of the switch. The compound switch lever S¹¹ is then thrown over so that the switch lever S¹⁰ engages the contact point S¹² and the switch lever S⁷ engages the contact point S¹³, thereby introducing the battery of the ordinary type B³ into the circuit of the dynamo. The current is then delivered from the charging machine from the brush G¹ through the series field coil D², conductor 6, switch lever S⁷, contact point S¹³, battery B³, contact point S¹², switch lever S¹⁰, and conductor 2, back to the brush G².

Figs. 2 and 3 show one set of my plates having the bus bars C¹ of copper or of other metal of low resistance, electrically united to the distributers C² which extend into the interior of the plates C⁵. These copper conductors are preferably covered with lead of a non-porous nature, applied hot or plastic or liquid by hydraulic or other heavy pressure between dies, and thereby protected from the acids of the battery.

In Fig. 3 is shown a side elevation of one of the plates C⁵. The distributer C² is shown passing through the plate in one of its two longest dimensions. It may pass into the plate in any other way by means of which it has a large area of contact between the copper and the lead, thereby giving a large collecting surface for the copper conductors from the lead portions of the plate.

The top view, Fig. 4, shows how the bus bars C¹ and C³ are alternated with each other so as to furnish paths for the current of more or less equal resistance from the distributers of one set of plates to the distributers of the other set of plates.

In my apparatus if an empty storage battery is suddenly connected to the charging circuit it is possible that the generator may develop too great an amperage for the battery. In this case it is desirable to introduce a regulator to prevent an over heavy charging current. For this purpose I have introduced in the main conductor a low resistance coil 14 and in shunt with this coil an electro-magnetic switch having a coil 15 and armature 16, and contact 17.

When an excess of current flows over the main conductor 2 the pull of the coil 15 over powers the pull of the spring 24 so that the armature 16 leaves the contact 17. This has the effect of introducing the resistances 25 and 26 and as many more as may be desired into the circuit of the shunt field coil D¹. The resistances 25 and 26 are short circuited by means of the armatures 27 engaging the back contacts 19. When the armature 16 is attracted by the coil 15 the coils 18 of the neutralizing coil and the relays become dead and the coils 18ᵃ attract the armatures 27 thereby opening the short circuits around the resistances 25 and 26 and then current flows from the charging machine D over the conductor 20 through the resistance 21, coils 18 and conductor 22 back to the charging machine D. This circuit is bridged across the charging machine and is counted upon to energize the relay coils 18 to attract the armature 27 when the circuit 23 is opened. When the current from the charging machine has dropped below the required point the pull of the spring 24 over-powers the coil 15 and closes the circuit at 17 causing current to flow from the charging machine through conductor 20, resistance 21 conductor 23, contact 17, armature 16, relay neutralizing coils 18ᵃ, conductor 22 and back to the charging machine.

These neutralizing coils 18ª have the effect of instantly neutralizing the magnetic effect of the coils 18 thereby releasing the armature 27 and closing the circuit at 19, thereby short-circuiting the resistances 25 and 26. When the resistances are short-circuited a greater amount of current flows through the shunt field coil $D^1$ which increases the out-put of the charging machine.

When the short-circuits around the resistances 25 and 26 are opened the discharge is absorbed by condensers 28 which are bridged across the contacts. By means of these circuits the out-put of the charging machine is, when the brush $R^1$ of the automatic resistance varying device R rests upon the contact $R^2$, maintained at a steady point. When the brush $R^1$ travels over contacts $R^5$, $R^4$ and $R^3$, or at least when the output of the charging machine is reduced below the maximum point, the regulator has no influence upon the operation of my apparatus. The various resistances and shunts are adjusted in accordance with ordinary engineering skill to secure these results.

In place of the resistances 25 and 26 any other resistances may be substituted, as long as these resistances influence the current flowing through the shunt field coil $D^1$.

It is quite possible to use a single resistance 25 or as many resistances as the construction of the apparatus and the out-put of the charging machine may require for efficient operation.

In operating my method I throw the switch S so that it engages contact points $S^3$ and $S^4$, thus throwing the shunt field coils and the automatic resistance varying device into operative relation with the charging machine armature to vary the amperage delivery of the charging machine. The automatic resistance varying device varies the resistance in the shunt field coil circuit periodically, causing the charging machine to deliver the large amperage stated for the periods stated, and then the amperage is dropped down by degrees to the low amperage until the gases have substantially disappeared, and then the amperage is again raised to a heavy charge. This process continues steadily until the battery has been charged, when it is disconnected from the circuit.

Many variations of my apparatus may be employed.

The automatic resistance varying device R may be placed anywhere in any circuit which will vary the amperage of the current delivery from the charging machine to the battery being charged.

Any other suitable device for varying the current may be employed in place of the automatic resistance varying device R, and any other suitable way may be used to vary the periodicity of the charge.

Many other variations may be made in my apparatus without departing from the spirit of my invention.

I claim—

1. In combination a charging apparatus for a storage battery having a charging generator and time-controlled means to step the current from said generator down from higher to lower amounts.

2. In combination a charging apparatus for a storage battery having a charging generator and automatic time-controlled means to step the current from said generator down from higher to lower amounts, and then up again to higher amounts.

3. In combination, a storage battery, a charging machine providing a source of charging current, means to connect said source to said storage battery, means to change said current to a lower amperage consisting of an automatic resistance varying device and resistance circuits varying from high to low associated with said charging machine and adapted to vary the degree of current applied to said battery.

4. In combination, a storage battery, a charging machine providing a source of charging current, means to connect said source to said storage battery, means to change said current to a lower amperage consisting of an automatic resistance varying device and resistance circuits varying from high to low associated with said charging machine and adapted to vary the degree of current applied to said battery and adapted to be connected in series with a shunt field, said shunt field forming a part of said charging machine.

5. In combination, a storage battery, a charging machine providing a source of heavy charging current, time controlled means to cause the delivery of the heavy current to the battery for arbitrarily fixed periods of efficient charging and to provide intervals to allow the substantial dissipation of obstacles to charging, said intervals characterized by a low charging current.

6. In combination, a storage battery, a charging machine providing a source of heavy charging current, time controlled means to cause the delivery of the heavy current to the battery for arbitrarily fixed periods of efficient charging, and to provide intervals to allow the substantial dissipation of obstacles to charging, said intervals characterized by a low charging current, said means consisting of an automatic resistance varying device.

7. In combination, a storage battery, a charging machine having a shunt field coil, providing a source of heavy charging current, time controlled means to cause the delivery of the heavy current to the battery for arbitrarily fixed periods of efficient charging, and to provide intervals to allow the substantial dissipation of obstacles to charging, said intervals characterized by a low charging current, said means consisting of an automatic resistance varying device, adapted to vary the degree of current applied to said battery located in the shunt circuit containing the shunt field coil.

8. In combination, a storage battery, a charging machine having a shunt field coil, providing a source of heavy charging current, time controlled means to cause the delivery of the heavy current to the battery for arbitrarily fixed periods of efficient charging, and to provide intervals to allow the substantial dissipation of obstacles to charging, said intervals characterized by a low charging current, said means consisting of an automatic resistance varying device adapted to vary the degree of current applied to said battery located in the shunt circuit containing the shunt field coil, in series therewith.

9. In combination, a storage battery, a charging machine having a shunt field coil, providing a source of heavy charging current, time controlled means to cause the delivery of the heavy current to the battery for arbitrarily fixed periods of efficient charging, and to provide intervals to allow the substantial dissipation of obstacles to charging, said intervals characterized by a low charging current, said means consisting of an automatic resistance varying device having changing circuits adapted to vary the degree of current applied to said battery located in the shunt circuit containing the shunt field coil, and having means adapted to automatically switch said changing circuits into said shunt field circuit.

Signed at New York, in the county of New York and State of New York, November, A. D. 1911.

DAVID H. WILSON.

Witnesses:
MYRON F. HILL,
A. L. TRAVIS.